Patented Dec. 1, 1936

2,062,443

UNITED STATES PATENT OFFICE 2,062,443

IMPROVED 4:4'-DIMETHYL-6:6'-DIHALOGEN THIOINDIGO

Paul Whittier Carleton, Penns Grove, and Edwin Lorenzo Mattison, Carneys Point, N. J., assignors to E. I. du Pont de Nemours & Company, Wilmington, Del., a corporation of Delaware No Drawing. Application October 10, 1934, Serial No. 747,784

4 Claims. (Cl. 260—53)

This invention relates to indigoid dyes, more particularly 4:4'-dimethyl-6:6'-dihalogen-thioindigos, and a process for the preparation thereof.

It is an object of the invention to produce thioindigoid dyes of the type described, characterized by improved strength and brilliancy. A further object is to provide a new and improved method for producing 4:4'-dimethyl-6:6'-dichloro-thioindigo in a state in which it possesses increased strength and brilliancy over a similar dyestuff obtained by the usual prior art methods. Other objects will appear hereinafter.

These objects are accomplished by treating the free leuco vat color with aqueous caustic alkali, with or without a suitable mild inorganic base, and heating preferably to about 90° C. to about 100° C., and thereafter oxidizing the solution to the color.

While the invention is susceptible to some variation and modification in the manner of its practical application, the following example, in which the quantities are stated in parts by weight, will serve to illustrate how it may be practiced.

Example

To 300 parts of 4:4'-dimethyl-6:6'-dichloro-thioindigo (12% paste) are added 1500 parts of water and 133 parts of 30% caustic soda solution. The mixture is heated to 70° to 75° C. and 40 parts of sodium hydrosulfite added. After reduction is complete, the mixture is cooled to room temperature and acidified with acetic acid. The precipitated leuco compound is filtered off and washed. The wet paste of the leuco derivative is slurried with 1800 parts of water, 60 parts of 30% caustic soda and 180 parts of potassium carbonate. The mixture is then heated to 90° to 100° C. After solution is obtained, heat is withdrawn and air is blown through the mixture until oxidation is complete. The oxidized product is filtered and washed. The product can be used directly for the preparation of dye pastes or powders.

It will be understood that the invention is not limited to the details of the above example. Variations of a type which will be recognized by those skilled in the art may be made. Vatting with caustic alkali and a hydrosulfite reducing agent are well known procedures. It is also recognized that the free leuco compound may be separated by acidification of the vat. Any suitable acid may be employed in the acidification, for example, carbonic acid, sulfur dioxide and hydrochloric acid.

The proportions of caustic alkali employed in the treatment of the free leuco derivative may vary widely, it being preferable, however, to employ a dilute caustic alkali. The mild inorganic base may suitably be a salt of a weak acid and a strong base, for instance, an alkali metal or an ammonium salt. It should be the type of compound which dissolves in water to give a solution having a pH greater than 7 but does not enter into double decomposition with the leuco derivative to form water-insoluble metal leuco derivatives.

In the precipitation of the dyestuff, other oxidizing agents than air may be employed as, for example, potassium ferricyanide.

The products obtained by the treatment above described are useful in printing and dyeing. In particular, in the above treatment products are obtained which on printing give unusual brightness and tinctorial power and, therefore, are of commercial importance.

As many apparent and widely different embodiments of this invention may be made without departing from the spirit and scope thereof, it is to be understood that we do not limit ourselves to the specific embodiments thereof except as defined in the appended claims.

We claim:

1. The process of producing improved 4:4'-dimethyl-6:6'-dihalogen thioindigos which comprises vatting a 4:4'-dimethyl-6:6'-dihalogen thioindigo, acidifying to cause precipitation of a leuco derivative, separating the precipitated leuco derivative, mixing said leuco derivative with an aqueous solution of caustic alkali and a substance selected from the class consisting of alkali metal and ammonium salts of weak acids which are water-soluble to give a solution having a pH greater than 7, then heating the mixture until solution is obtained, thereafter cooling and adding an oxidizing agent to precipitate the dyestuff.

2. The process of producing improved 4:4'-dimethyl-6:6'-dichloro-thioindigo which comprises adding about 1500 parts of water and about 133 parts of 30% caustic soda to about 300 parts of 4:4'-dimethyl-6:6'-dichloro-thioindigo as a 12% paste, heating the mixture to about 70° to 75° C. and adding about 40 parts of sodium hydrosulfite, then after reduction cooling to room temperature and acidifying with acetic acid whereby the free leuco derivative is precipitated, separating said precipitated leuco derivative and mixing it with about 1800 parts of water, about 60 parts of 30% caustic soda and about 180 parts of potassium carbonate, then heating the mixture to about 90° to about 100° C., cooling the resultant solution, and oxidizing it with air.

3. The process of producing improved 4:4'-dimethyl-6:6'-dichloro-thioindigo which comprises vatting 4:4'-dimethyl-6:6'-dichloro-thioindigo, acidifying to cause precipitation of the free leuco derivative, separating the precipitated leuco derivative, immediately mixing said leuco derivative with a dilute aqueous solution of caustic alkali and a substance selected from the class consisting of alkali metal and ammonium salts of weak acids which are water-soluble to give a solution having a pH greater than 7, then heating the mixture to about 90°–100° C. until solution is obtained, thereafter cooling and adding an oxidizing agent to precipitate the dyestuff.

4. The process of producing improved 4:4'-dimethyl-6:6'-dichloro-thioindigo which comprises vatting 4:4'-dimethy-6:6'-dichloro-thioindigo, acidifying to cause precipitation of the free leuco derivative, separating the precipitated leuco derivative, mixing said leuco derivative with a dilute aqueous solution of caustic alkali and a substance selected from the class consisting of alkali metal and ammonium salts of weak acids which are water-soluble to give a solution having a pH greater than 7, heating the mixture until solution is obtained, thereafter cooling, and adding an oxidizing agent to precipitate the dyestuff.

PAUL WHITTIER CARLETON.
EDWIN LORENZO MATTISON.